United States Patent
Andersen et al.

(10) Patent No.: US 11,466,663 B2
(45) Date of Patent: Oct. 11, 2022

(54) WIND TURBINE WITH A PIVOTED ROTOR BLADES, WIRE AND RELEASE MECHANISM FOR STOPPING

(71) Applicant: Vestas Wind Systems A/S, Aarhus N. (DK)

(72) Inventors: Peter Bjørn Andersen, Skanderborg (DK); Thomas S. Bjertrup Nielsen, Randers (DK); Aksel Petersen, Rinkøbing (DK); Peng Wang, Hasselager (DK)

(73) Assignee: Vestas Wind Systems A/S, Aarhus N (DK)

( * ) Notice: Subject to any disclaimer, the term of this patent is extended or adjusted under 35 U.S.C. 154(b) by 32 days.

(21) Appl. No.: 17/059,720

(22) PCT Filed: Jun. 12, 2019

(86) PCT No.: PCT/DK2019/050183
§ 371 (c)(1),
(2) Date: Nov. 30, 2020

(87) PCT Pub. No.: WO2019/238191
PCT Pub. Date: Dec. 19, 2019

(65) Prior Publication Data
US 2021/0215134 A1    Jul. 15, 2021

(30) Foreign Application Priority Data

Jun. 14, 2018  (DK) ............................ PA 2018 70394

(51) Int. Cl.
*F03D 7/02*     (2006.01)
*F03D 80/00*    (2016.01)

(52) U.S. Cl.
CPC ......... *F03D 7/0236* (2013.01); *F03D 7/0244* (2013.01); *F03D 7/0268* (2013.01);
(Continued)

(58) Field of Classification Search
CPC .... F03D 7/0236; F03D 7/0244; F03D 7/0268; F03D 80/00; F03D 1/0625;
(Continued)

(56) References Cited

U.S. PATENT DOCUMENTS

| 13,156 A | * | 7/1855 | Brown | F03D 80/00 416/89 |
| 134,499 A | * | 12/1872 | Mabie | G01F 23/34 137/213 |

(Continued)

FOREIGN PATENT DOCUMENTS

| DE | 160494 C | 10/1903 |
| DE | 647287 C | 7/1937 |

(Continued)

OTHER PUBLICATIONS

Danish Patent and Trademark Office, Search and Examination Report in PA 2018 70394, dated Dec. 18, 2018.

(Continued)

*Primary Examiner* — Kenneth Bomberg
*Assistant Examiner* — Ryan C Clark
(74) *Attorney, Agent, or Firm* — Wood Herron & Evans LLP

(57) ABSTRACT

A wind turbine (1) comprising a tower (2), a nacelle (3) and a hub (7) is disclosed. The hub (7) comprises a blade canying structure (4) with one or more wind turbine blades (5) connected thereto. Each of the wind turbine blades (5) is connected to the blade canying structure (4) via a hinge (6) at a hinge position of the wind turbine blade (5), each wind turbine blade (5) thereby being arranged to perform pivot movements relative to the blade carrying structure (4) between a minimum pivot angle and a maximum pivot angle. The wind turbine (1) further comprises a stop mechanism arranged to move the wind turbine blades (5) to a safe (Continued)

pivot angle in the case of an emergency, the stop mechanism comprising a release mechanism (8, 12, 14) and at least one wire (9, 10) interconnecting the release mechanism (8, 12, 14) and each of the wind turbine blades (5). Activation of the release mechanism (8, 12, 14) causes an abrupt change in a pulling force applied to the wind turbine blades (5) by the wire(s) (9, 10), the change in pulling force causes the wind turbine blades (5) to move immediately to the safe pivot angle.

19 Claims, 12 Drawing Sheets

(52) U.S. Cl.
CPC ...... *F03D 80/00* (2016.05); *F05B 2240/2022* (2013.01); *F05B 2260/30* (2013.01); *F05B 2260/964* (2013.01)

(58) Field of Classification Search
CPC .......... F05B 2240/2022; F05B 2260/30; F05B 2260/964
See application file for complete search history.

(56) References Cited

U.S. PATENT DOCUMENTS

| | | | | |
|---|---|---|---|---|
| 147,188 | A * | 2/1874 | Spicer | F03D 80/00 416/41 |
| 1,558,645 | A * | 10/1925 | Terhorst | F03D 7/0236 416/138 |
| 2,094,941 | A * | 10/1937 | Burkhartsmeier | F03D 7/0224 416/138 |
| 2,516,576 | A * | 7/1950 | Jacobs | F03D 7/0236 416/135 |
| 4,087,202 | A | 5/1978 | Musgrove | |
| 4,183,715 | A * | 1/1980 | Ducker | F03D 7/0224 416/41 |
| 4,201,514 | A * | 5/1980 | Huetter | F03D 7/041 416/102 |
| 4,310,284 | A * | 1/1982 | Randolph | F03D 7/0224 416/41 |
| 4,316,699 | A * | 2/1982 | Schott | F03D 7/0224 416/139 |
| 4,335,996 | A * | 6/1982 | Ross | F03D 7/0236 416/88 |
| 4,349,315 | A * | 9/1982 | Ducker | F03D 7/0224 416/41 |
| 4,632,637 | A * | 12/1986 | Traudt | F03D 7/0224 416/41 |
| 8,678,767 | B2 * | 3/2014 | Mok | F03D 7/0236 416/201 A |
| 8,753,080 | B2 * | 6/2014 | Morimoto | F03D 7/0268 416/37 |
| 2004/0052649 | A1 * | 3/2004 | Murase | F04B 27/0878 417/222.1 |
| 2005/0196281 | A1 * | 9/2005 | Kim | F03D 1/0658 416/132 B |
| 2005/0200135 | A1 | 9/2005 | Shibata et al. | |
| 2010/0143131 | A1 * | 6/2010 | Pitre | F03D 7/0236 416/85 |
| 2010/0226774 | A1 * | 9/2010 | Deering | F03D 7/024 416/117 |
| 2010/0301607 | A1 | 12/2010 | Morimoto | |
| 2011/0211957 | A1 * | 9/2011 | Folsom | F03D 1/0658 416/135 |
| 2015/0152844 | A1 * | 6/2015 | Pitre | F03D 7/0268 416/142 |
| 2017/0114774 | A1 * | 4/2017 | Lee | F03D 7/0236 |

FOREIGN PATENT DOCUMENTS

| | | |
|---|---|---|
| DE | 2546884 A1 | 4/1977 |
| FR | 1013456 A | 7/1952 |
| KR | 20160138661 A | 12/2016 |
| WO | 9620343 A2 | 7/1996 |

OTHER PUBLICATIONS

European Patent Office, International Search Report and Written Opinion in PCT Application No. PCT/DK2019/050183, dated Sep. 19, 2019.

* cited by examiner

WIND TURBINE WITH A PIVOTED ROTOR BLADES, WIRE AND RELEASE MECHANISM FOR STOPPING

FIELD OF THE INVENTION

The present invention relates to a wind turbine comprising a tower, a nacelle and a hub comprising a blade carrying structure. One or more wind turbine blades are pivotally connected to the blade carrying structure via a hinge. The wind turbine of the invention further comprises a stop mechanism.

BACKGROUND OF THE INVENTION

Wind turbines are normally controlled in order to provide a desired power output and in order to control loads on the wind turbine. For horizontal axis wind turbines, i.e. wind turbines with a rotor which rotates about a substantially horizontal rotational axis, this may be obtained by controlling a pitch angle of the wind turbine blades. In this case the angle of attack of the wind turbine blades relative to the incoming wind is adjusted by rotating the wind turbine blades about a longitudinal axis. In the case that it is required to stop operation of the wind turbine, e.g. due to an emergency, the wind turbine blades are moved to a feathered position by means of the pitch mechanism.

Traditional pitch control as described above requires sensor based controllers as well as mechanical parts, e.g. in the form of pitch bearings and drive units. Such controllers and mechanical parts require maintenance. This may be difficult in the case that the wind turbine is positioned at a remote location. In this case failure or breakdown may lead to extensive downtime, e.g. due to long transportation time for maintenance personnel or long delivery time on spare parts. It is therefore desirable to provide a wind turbine which can be controlled in a simple manner, and where the maintenance requirements are reduced as compared to traditional pitch controlled wind turbines.

U.S. Pat. No. 4,632,637 discloses a high speed, downwind horizontal axis wind turbine having three circumferentially spaced lightweight blades having inner support arms radially outwardly disposed blade segments which are pivotally connected to the support arms, so as to fold straight downwind under high wind conditions or high rotating speeds. U.S. Pat. No. 4,632,637 discloses operation of the wind turbine at various wind speeds during normal operation, but provides no remedy with respect to handling emergency situations, where the wind turbine needs to be brought to a stop immediately.

DESCRIPTION OF THE INVENTION

It is an object of embodiments of the invention to provide a wind turbine with hinged wind turbine blades, which can be brought to a stop in an easy and reliable manner.

The invention provides a wind turbine comprising a tower, a nacelle mounted on the tower via a yaw system, a hub mounted rotatably on the nacelle, the hub comprising a blade carrying structure, and one or more wind turbine blades connected to the blade carrying structure, wherein each of the wind turbine blades defines an inner tip end and an outer tip end, and wherein each of the wind turbine blades is connected to the blade carrying structure via a hinge at a hinge position of the wind turbine blade, each wind turbine blade thereby being arranged to perform pivot movements relative to the blade carrying structure between a minimum pivot angle and a maximum pivot angle, wherein the wind turbine further comprises a stop mechanism arranged to move the wind turbine blades to a safe pivot angle in the case of an emergency, the stop mechanism comprising a release mechanism and at least one wire interconnecting the release mechanism and each of the wind turbine blades, wherein activation of the release mechanism causes an abrupt change in a pulling force applied to the wind turbine blades by the wire(s), the change in pulling force causing the wind turbine blades to move immediately to the safe pivot angle.

Thus, the wind turbine of the invention comprises a tower with a nacelle mounted thereon, via a yaw system. Accordingly, the nacelle can rotate about a substantially vertical rotational axis, relative to the tower, in order to direct a rotor of the wind turbine into the incoming wind. The yaw system may be an active yaw system in which the nacelle is rotated actively by means of a yaw drive mechanism, e.g. on the basis of measurements of the wind direction. As an alternative, the yaw system may be a passive yaw system in which the nacelle automatically rotates according to the wind direction without the use of a yaw drive mechanism.

The nacelle may be a traditional nacelle having an outer wall enclosing an interior of the nacelle, the nacelle housing various components of the wind turbine, such as generator, drive train, etc. As an alternative, the nacelle may simply be a structure which is capable of performing yawing movements relative to the tower. In this case some or all of the components described above may be arranged outside the nacelle, e.g. in an interior part of the tower.

A hub is mounted rotatably on the nacelle. The hub comprises a blade carrying structure having one or more wind turbine blades connected thereto.

Accordingly, the wind turbine blades rotate along with the hub and the blade carrying structure relative to the nacelle.

In the present context the term 'wind turbine blade' should be interpreted to mean a component which is connected to the blade carrying structure via a hinge, in the manner described below. The component will define an aerodynamic profile in some or all sections but might have arms and contra weight in other sections, i.e. it might have sections with less or none contribution to the power production of the wind turbine.

The wind turbine is preferably a horizontal axis wind turbine.

Each of the wind turbine blades defines an inner tip end and an outer tip end. In the present context the term 'inner tip end' should be interpreted to mean an extremity of the wind turbine blade which is arranged closest to the hub. Similarly, in the present context the term 'outer tip end' should be interpreted to mean an extremity of the wind turbine blade which is arranged furthest away from the hub.

Each of the wind turbine blades is connected to the blade carrying structure via a hinge at a hinge position of the wind turbine blade. Thereby each of the wind turbine blades is arranged to perform pivot movements relative to the blade carrying structure, via the hinge. A pivot angle is thereby defined between each wind turbine blade and the blade carrying structure, depending on the position of the hinge and thereby of the wind turbine blade relative to the blade carrying structure. Accordingly, the pivot angle defines the direction along which a given wind turbine blade extends relative to the blade carrying structure, and thereby relative to the hub. This, in turn, determines a diameter of the rotor, and thereby the ability of the wind turbine to extract energy from the wind.

The hinge may be or comprise a bearing, e.g. in the form of a journal bearing, a roller bearing, or any other suitable kind of bearing.

The pivot angle can vary between a minimum pivot angle, defining a minimum rotor diameter, and a maximum pivot angle, defining a maximum rotor diameter.

The wind turbine further comprises a stop mechanism arranged to move the wind turbine blades to a safe pivot angle in the case of an emergency. Thereby the wind turbine blades are protected in the case of an emergency. It is also not ruled out that the stop mechanism is activated in the case that it is desired to stop operation of the wind turbine and move the wind turbine blades to the safe pivot angle for other reasons than an emergency.

The safe pivot angle may arrange the wind turbine blades in such a manner that each wind turbine blade extends along a direction which is substantially parallel to a rotational axis of the hub. This position of the wind turbine blades defines a minimum rotor diameter and is sometimes referred to as 'barrel mode'. When the wind turbine blades are arranged in this position, the impact on the wind turbine blades from the wind is minimised, and thereby it is ensured that the loads on the wind turbine blades, the hub, etc. are also minimised. In the case that the stop mechanism is activated for other reasons than an emergency, the safe pivot angle may arrange the wind turbine blades at a small angle with respect to the rotational axis of the hub. This angle may be dependent on the wind speed.

The stop mechanism comprises a release mechanism and at least one wire interconnecting the release mechanism and each of the wind turbine blades. The wire(s) apply a pulling force to each of the wind turbine blades, e.g. pulling the wind turbine blades away from the safe pivot angle, such as towards a pivot angle providing a maximum rotor diameter. Activation of the release mechanism causes an abrupt change in this pulling force, and this causes the wind turbine blades to immediately move to the safe pivot angle. In the present context the term 'immediately move' should be interpreted to mean that the movement is initiated upon activation of the release mechanism, and that the safe pivot angle is reached shortly thereafter, e.g. within 10-15 seconds or even faster. Thereby the safe pivot angle is reached reliably and quickly following the activation of the release mechanism.

In the present context the term 'wire' should be interpreted to mean a part which interconnects the release mechanism and one of the wind turbine blades, while being capable of providing a pulling force to the wind turbine blades. The wire could, e.g., be in the form of a traditional steel wire, a rope, a chain, a belt, etc. In the case that the wire is in the form of a belt, it may, e.g., be a carbon fibre belt, which is very durable and capable of withstanding repeated movement over pulleys or the like.

The release mechanism can, e.g., be activated to release the wire, thereby releasing the wind turbine blades. Thus, during normal operation the wire pulls the wind turbine blades, thereby preventing the wind turbine blades from immediately moving to the safe pivot angle. However, when the release mechanism is activated, the wire is immediately released, and the wind turbine blades are immediately allowed to move to the safe pivot angle. Thereby the safe pivot angle can be reached quickly and reliably, and without requiring complicated mechanical structures or control mechanisms.

In the case of an emergency stop, the rotor may be brought to a complete stop by activating the release mechanism followed by setting, e.g., a mechanical or an electrical brake, e.g. found at the drivetrain of the wind turbine. Such a brake may, according to one embodiment, be placed at the high speed shaft between a possible gear and the generator of the wind turbine. The brake can be applied at the same time as the release mechanism is activated or with a short time delay to ensure that the rotor speed is reduced prior to setting the brake.

The at least one wire may be a spring biased wire. The spring biased wire could, e.g., comprise one or more sections of rigid wire and one or more springs, such as compressible springs. As an alternative, the spring biased wire could be in the form of an elastic rope. As another alternative, the spring effect could be provided by a hydraulic system connected to the wire. This is in particular relevant for large wind turbines where the forces to be handled by the wires are expected to be relatively large.

According to this embodiment, the pivot angle of the wind turbine blades is allowed to vary, due to the spring effect of the spring biased wire. Accordingly, the pivot angle, and thereby the rotor diameter, can be varied during normal operation of the wind turbine, in accordance with the wind speed.

Alternatively or additionally, the release mechanism may comprise a hanging mass attached to the wire. The hanging mass provides a tension in the wire, and thereby the wind turbine blades are pulled towards a position defining maximum rotor diameter. However, the pivot angle of the wind turbine blades is allowed to vary, since the vertical position of the hanging mass is adjustable.

The release mechanism may be activated by detaching the hanging mass from the wire. Thereby the wire is no longer pulling the wind turbine blades towards the position defining maximum rotor diameter, i.e. the pulling force is abruptly changed, and the blades are free to move towards a safe position defining a smaller rotor diameter.

As an alternative, the release mechanism may be activated by lifting the hanging mass, thereby decreasing the tension of the wire and reducing the pull on the wind turbine blades.

As another alternative, the release mechanism may be activated by increasing the length of the wire, while holding the hanging mass at the same vertical position. This also decreases the tension of the wire and reduces the pull on the wind turbine blades. The length of the wire may be increased by unwinding wire. Alternatively, the wire may, during normal operation, be connected to one or more attachment point, e.g. in the form of pulleys or the like attached to an inner wall of the tower or the like. Thereby the path followed by the wire between the release mechanism and the wind turbine blades is longer than a direct path there between. Activation of the release mechanism may then be performed by releasing the wire from one or more attachment points, and this will decrease the tension of the wire.

The release mechanism may be or comprise a winding mechanism for winding up the wire. According to this embodiment, the wire can be easily tensioned to a suitable tension level, simply by winding up the wire. This may, e.g., be performed manually or by means of a winch. The winding mechanism may, e.g., be provided with a ratchet mechanism which prevents the wire from unwinding during normal operation. In this case the release mechanism may be activated by unlocking the ratchet mechanism, thereby immediately allowing the wire to unwind.

Each of the wind turbine blades may be connected to the release mechanism via a separate wire. According to this embodiment, the wires connected to the respective wind turbine blades may extend in parallel for at least some of the distance towards the release mechanism. The wires may be connected to the same release mechanism or the wires may be connected to separate release mechanisms. In the case that the wires are connected to separate release mechanisms, the release mechanisms may be adapted to be activated simultaneously, e.g. via a common activation mechanism.

When each of the wind turbine blades is connected to the release mechanism via a separate wire, the wires can be tensioned individually, thereby obtaining an optimal tensioning for each wind turbine blade.

As an alternative, each of the wind turbine blades may be connected to a common wire which is connected to the release mechanism. According to this embodiment, each wind turbine blade is connected to the common wire via a separate connecting wire. The common wire may be spring biased, while the connecting wires are stiff wires. As an alternative, the connecting wires may be spring biased, while the common wire is a stiff wire. As another alternative, the connecting wires as well as the common wire may be spring biased. As yet another alternative, the connecting wires as well as the common wire may be stiff wires.

The release mechanism may be arranged at a bottom part of the tower.

According to this embodiment the release mechanism is easily accessible for personnel, and thereby the release mechanism can easily be activated manually in order to stop operation of the wind turbine, e.g. in the case of an emergency.

Alternatively, the release mechanism may be placed in another part of the wind turbine, such as in the nacelle or in the rotor, e.g. within the hub or within the blade carrying structure, or it may be arranged outside the wind turbine, e.g. on the ground next to the tower.

In the case that each wind turbine blade is connected to the release mechanism via a separate wire, the wires may extend in parallel inside the tower between the release mechanism and the nacelle. In the case that each wind turbine blade is connected to a common wire which is connected to the release mechanism, the common wire may extend inside the tower between the release mechanism and a connecting point at or in the vicinity of the nacelle, and the connecting wires of the respective wind turbine blades may each extend between a wind turbine blade and the connecting point of the common wire.

The hinge position of each of the wind turbine blades may be arranged at a distance from the inner tip end and at a distance from the outer tip end. According to this embodiment, the wind turbine blade is hinged to the blade carrying structure at a position which is not at an end of the wind turbine blade, contrary to conventional pitch controlled wind turbines, where the wind turbine blades are attached to the hub at a root end of the wind turbine blade.

Each of the wind turbine blades may be connected to the wire at a position of the wind turbine blade which is between the hinge position and the inner tip end of the wind turbine blade. According to this embodiment, the wire will tend to pull the wind turbine blade towards a position defining a maximum rotor diameter.

Each of the wind turbine blades may have a centre of mass for the wind turbine blade at rest, the centre of mass being positioned between the hinge position and the inner tip end of the wind turbine blade. According to this embodiment, the centre of mass for the wind turbine blade is arranged in a part of the wind turbine blade which is arranged closer to the hub than the hinge position. In this case, when the hub rotates relative to the nacelle during normal operation, a centrifugal force acts on each of the wind turbine blades, at the position of the centre of mass. Thereby the centrifugal force will tend to push the part of the wind turbine blade arranged between the hinge position and the inner tip end, i.e. the part of the wind turbine blade where the centre of mass is arranged, in an outwards direction. This will cause the wind turbine blades to pivot via the hinges in such a manner that the wind turbine blades are rotated towards a position where the longitudinal direction of the wind turbine blades is arranged substantially parallel to the rotational axis of the hub. Thereby the wind turbine blades are pivoted in such a manner that the diameter of the rotor is reduced.

The higher the rotational speed, the further the wind turbine blades will be pivoted towards this position.

Thus, according to this embodiment, the diameter of the rotor is automatically reduced as the rotational speed of the hub increases, during normal operation of the wind turbine. Accordingly, the rotor diameter, and thereby the ability of the wind turbine to extract energy from the wind, is automatically adjusted according to the prevailing wind speed, without requiring complicated control algorithms or maintenance requiring mechanical parts, such as pitch mechanisms, etc.

Alternatively or additionally, aerodynamic forces acting on the aerodynamic profiles of the wind turbine blades may cause the wind turbine blades to pivot in such a manner that the diameter of the rotor is reduced as the wind speed increases, during normal operation. In a preferred embodiment, the centrifugal force and the aerodynamic forces cooperate in reducing the rotor diameter as the wind speed increases, i.e. they are not counteracting each other. For some wind turbines, e.g. small wind turbines, the centrifugal force may be the dominating factor with respect to ensuring that the wind turbine blades are pivoted towards smaller rotor diameter. For other wind turbines, e.g. larger wind turbines, the aerodynamic forces may be the dominating factor.

The wind turbine may further comprise a balancing mass arranged on the nacelle opposite to an attachment position of the hub. The hub and the balancing mass may preferably be arranged at opposing sides of the tower in the sense that the hub and the balancing mass are arranged on parts of the nacelle which are positioned at opposing sides of a region of the nacelle which defines an interface towards the tower. The hub and the wind turbine blades connected thereto will normally be relatively heavy, and gravity acting on the hub and the wind turbine blades may thereby introduce substantive loads in the wind turbine. By positioning a balancing mass on the nacelle in the manner described above, the loads introduced by gravity acting on the hub and the wind turbine blades, in particular tilt moments, are at least partly counteracted. The weight of the balancing mass may be selected in such a manner that it precisely balances the weight of the hub and the wind turbine blades.

The wind turbine may be a downwind wind turbine. According to this embodiment, the rotor faces away from the incoming wind, i.e. the wind reaches the wind turbine blades after having passed the nacelle. Downwind wind turbines are very suitable for applying passive yaw systems, i.e. yaw systems which automatically direct the rotor of the wind turbine towards the incoming wind without the use of yaw drives and control systems. This further reduces the need for components which are prone to require maintenance. Furthermore, in downwind wind turbines a passive cooling system can be arranged upwind with respect to the rotor, thereby enabling improved cooling of various wind turbine components.

As an alternative, the wind turbine may be an upwind wind turbine, in which case the rotor faces the incoming wind.

The wind turbine may further comprise biasing means biasing the wind turbine blades towards a position providing a maximum rotor diameter. According to this embodiment, the wind turbine blades will be in a position providing a maximum rotor diameter when no other forces act on the wind turbine blades. In particular, when the wind speed is low and the hub therefore does not rotate, or only rotates at a low rotational speed, no or only a small centrifugal force acts on the wind turbine blades. Since the biasing means biases the wind turbine blades towards a maximum rotor diameter, the rotor diameter is large under these conditions. Thereby it is ensured that the wind turbine is capable of extracting as much energy as possible from the wind. It is also ensured that the wind turbine blades are actually in a position where they are capable of catching the wind and cause the hub to rotate once the wind speed increases. The wire(s) interconnecting the release mechanism and the wind turbine blades may be or form part of the biasing means. In this case the pulling force applied to the wind turbine blades by the wire(s) pulls the wind turbine blades towards the position providing a maximum rotor diameter.

The wind turbine may, in this case, be provided with a build-in gearing, e.g. in the form of a pulley and tackle system, or another type of gear, which can be beneficial for reducing the required pull force of the biasing means.

On the other hand, when the wind speed is higher, the hub rotates at a higher rotational speed, and thereby the centrifugal force acting on the wind turbine blades is larger. At some point the centrifugal force, together with aerodynamic forces acting on the wind turbine blades, becomes sufficiently large to at least partly overcome the biasing force of the biasing means, and thereby the wind turbine blades will start pivoting towards a position defining a minimum rotor diameter, i.e. the rotor diameter decreases. Due to the biasing force it is ensured that this decrease in rotor diameter is obtained in a smooth and gradual manner, during normal operation of the wind turbine.

The at least one wire may be a spring biased wire, and the spring biased wire may form part of the biasing means. According to this embodiment, the biasing force is immediately removed when the release mechanism is activated, and thereby the wind turbine blades are immediately moved towards a position providing a minimum rotor diameter.

Alternatively or additionally, the biasing means could, e.g., comprise other kinds of springs mounted on the wind turbine blades.

The wind turbine may further comprise end stop mechanisms arranged to slow pivot movements of the wind turbine blades in a region near the minimum pivot angle and/or in a region near the maximum pivot angle. According to this embodiment it is ensured that the pivoting movements of the wind turbine blades are not stopped abruptly at the minimum pivot angle and/or at the maximum pivot angle. Instead, the end stop mechanisms ensure that the pivoting movements are stopped in a smooth and gradual manner. This protects the wind turbine blades as well as parts arranged in the vicinity of the wind turbine blades from damage caused by collisions, in particular in the case of activation of the release mechanism, causing the wind turbine blades to move immediately to the safe pivot angle.

The end stop mechanism may comprise a spring and/or a damper. For instance, the end stop mechanism could include springs mounted on the wind turbine blades and/or resilient pads which the wind turbine blades abut at the minimum pivot angle and/or at the maximum pivot angle. The springs could, e.g., be in the form of torsional springs arranged in the hinge or compressible springs mounted between the blade carrying structure and the wind turbine blades. The compressible spring could, e.g., be in a neutral state at a medium pivot angle, in a compressed state at smaller pivot angles and in a stretched state at larger pivot angles, or vice versa. In this case the compressible spring is capable of slowing down pivoting movements of the wind turbine blades at small pivot angles as well as at large pivot angles.

The hinge of each of the wind turbine blades may be embedded in the wind turbine blade. According to this embodiment, the actual hinge does not protrude from an outer surface of the wind turbine blade, and thereby the aerodynamic properties of the wind turbine blade are maintained in the hinge region, resulting in less penalty with respect to power production. As an alternative, the hinge may be attached to an outer surface of the wind turbine blade.

The wind turbine may further comprise a locking mechanism for locking the wind turbine blades at the safe pivot angle. According to this embodiment, once the safe pivot angle has been reached, the wind turbine blades are locked in this position. Thereby it is prevented that the wind turbine blades are accidentally moved away from the safe pivot angle. For instance, the locking mechanism may require active unlocking in order to release the wind turbine blades from the locked position.

The locking mechanism may lock the wind turbine blades automatically when the safe pivot angle is reached. This could, e.g., be obtained by means of a locking mechanism in which a locking member formed on the wind turbine blade or on the blade carrying structure is automatically moved into locking engagement with a part of the blade carrying structure or the wind turbine blade when the locking member and the part are moved into contact.

The locking mechanism may lock the wind turbine blades mechanically, magnetically, or in any other suitable manner. Furthermore, the locking mechanism may be activated mechanically, electrically, hydraulically, or in any other suitable manner.

BRIEF DESCRIPTION OF THE DRAWINGS

The invention will now be described in further detail with reference to the accompanying drawings in which.

DETAILED DESCRIPTION OF THE DRAWINGS

Figure 1:
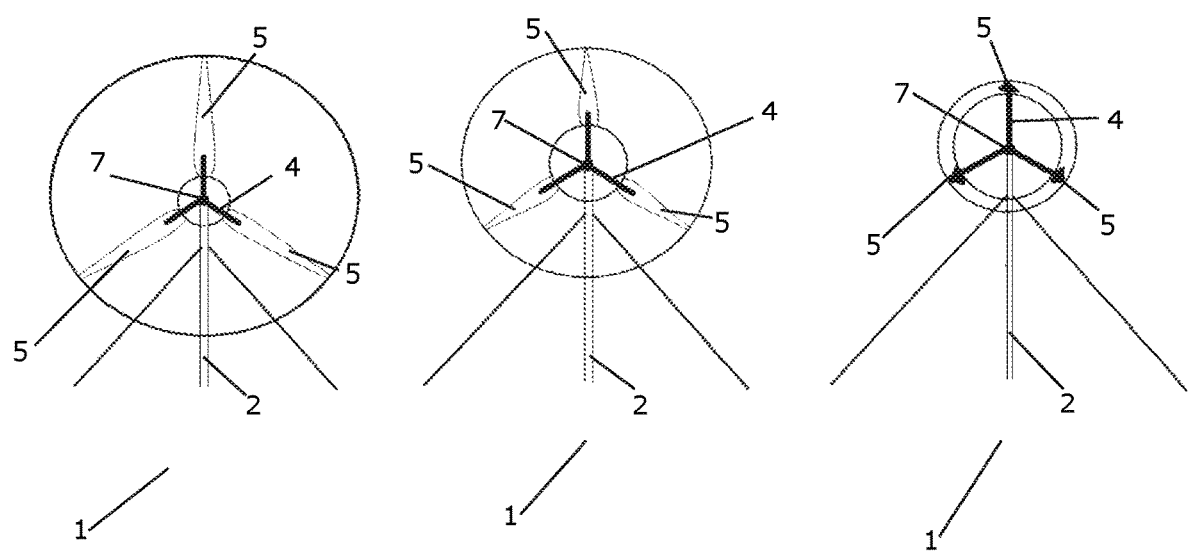
FIG. 1 illustrates a wind turbine according to an embodiment of the invention with the wind turbine blades in three different positions.

FIG. 1 illustrates a wind turbine 1 according to an embodiment of the invention at three different wind speeds, during normal operation. The wind turbine 1 comprises a tower 2 and a nacelle (not visible) mounted on the tower 2. A hub 7 is mounted rotatably on the nacelle, the hub 7 comprising a blade carrying structure 4 with three arms. A wind turbine blade 5 is connected to each of the arms of the blade carrying structure 4 via a hinge (not visible). Thus, the wind turbine blades 5 rotate along with the hub 7, relative to the nacelle, and the wind turbines blades 5 can perform pivoting movements relative to the blade carrying structure 4, via the hinges.

The left most drawing shows the wind turbine 1 at a low wind speed. In this case the rotational speed of the hub 7 is low, and therefore the centrifugal force acting on the wind turbine blades 5 is small. Accordingly, the rotor diameter is maximum.

The middle drawing shows the wind turbine 1 at a wind speed which is higher than the wind speed of the left most drawing. Accordingly, the rotational speed of the hub 7 is higher, and the centrifugal force acting on the wind turbine blades 5 is larger. Additionally, the aerodynamic forces acting on the wind turbine blades 5 are also larger. As a consequence, the wind turbine blades 5 have been pivoted towards a position defining a smaller rotor diameter.

The right most drawing shows the wind turbine 1 at a high wind speed. In this case the rotational speed of the hub 7 is very high, and therefore the centrifugal force acting on the wind turbine blades 5 is large. In addition, the aerodynamic forces at the high wind speed push the wind turbine blades 5 into the shown position. This has the consequence that the wind turbine blades 5 have been pivoted to a position defining a minimum rotor diameter. It can be seen that the wind turbine blades 5 are arranged substantially parallel to a rotational axis of the hub 7. This position is sometimes referred to as barrel mode.

The position of the wind turbine blades 5 in the right most drawing is also the position which is assumed following the activation of a stop mechanism, since this position of the wind turbine blades 5 represents a safe position. In FIG. 1, the stop mechanism of the wind turbine 1 is not shown.

Figure 2:
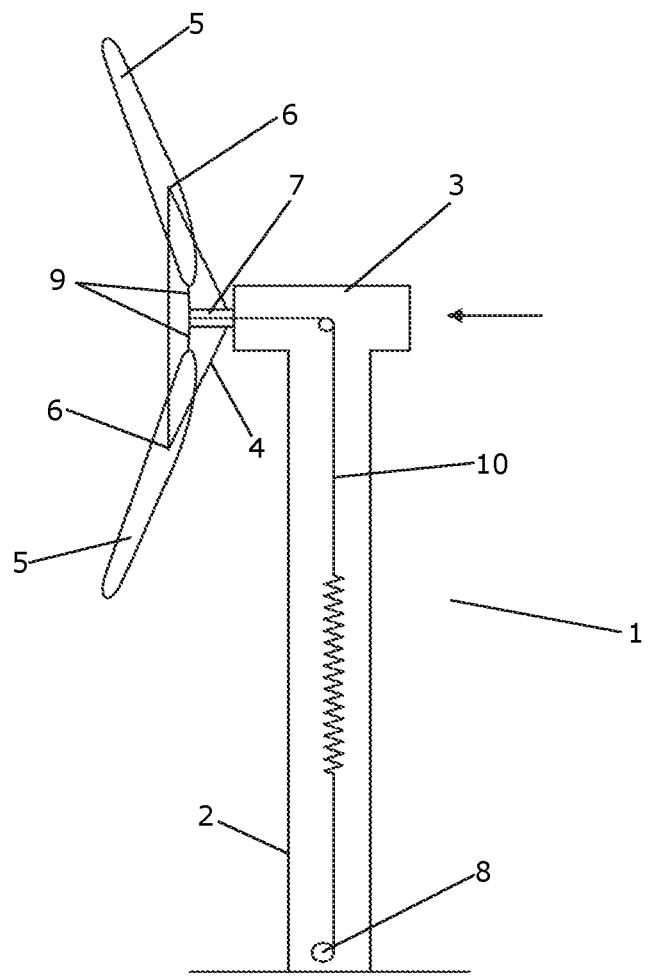
FIG. 2 is a side view of a wind turbine according to a first embodiment of the invention during operation at low wind speeds.

FIG. 2 is a side view of a wind turbine 1 according to a first embodiment of the invention during normal operation. The wind turbine 1 comprises a tower 2, a nacelle 3, a hub 7 and a blade carrying structure 4. A number of wind turbine blades 5 are each connected to the blade carrying structure 4 via a hinge 6. Thereby the wind turbine blades 5 are able to perform pivot movements relative to the blade carrying structure 4. The pivot angle thereby defined between the wind turbine blades 5 and the blade carrying structure 4 determines a rotor diameter of the wind turbine 5.

The wind turbine 1 is further provided with a stop mechanism comprising a release mechanism 8 in the form of a winding mechanism arranged at a bottom part of the tower 2. Each of the wind turbine blades 5 is connected to the release mechanism 8 via a connecting wire 9 and a spring biased common wire 10 interconnecting the connecting wires 9 and the release mechanism 8. The release mechanism 8 is in a locked state in which the winding mechanism of the release mechanism 8 is prevented from rewinding. Thereby a small tension is maintained in the spring biased common wire 10.

The spring biased common wire 10 pulls the wind turbine blades 5 towards a position which defines a maximum rotor diameter. FIG. 2 shows the wind turbine 1 in a situation where the wind speed is low. Thereby the rotational speed of the hub 7 is also low, resulting in a low centrifugal force acting on the wind turbine blades 5. Thereby the resulting force acting on the wind turbine blades 5 is dominated by the force provided by the spring biased common wire 10, and therefore the wind turbine blades 5 are in the position which provides a maximum rotor diameter.

Figure 3:
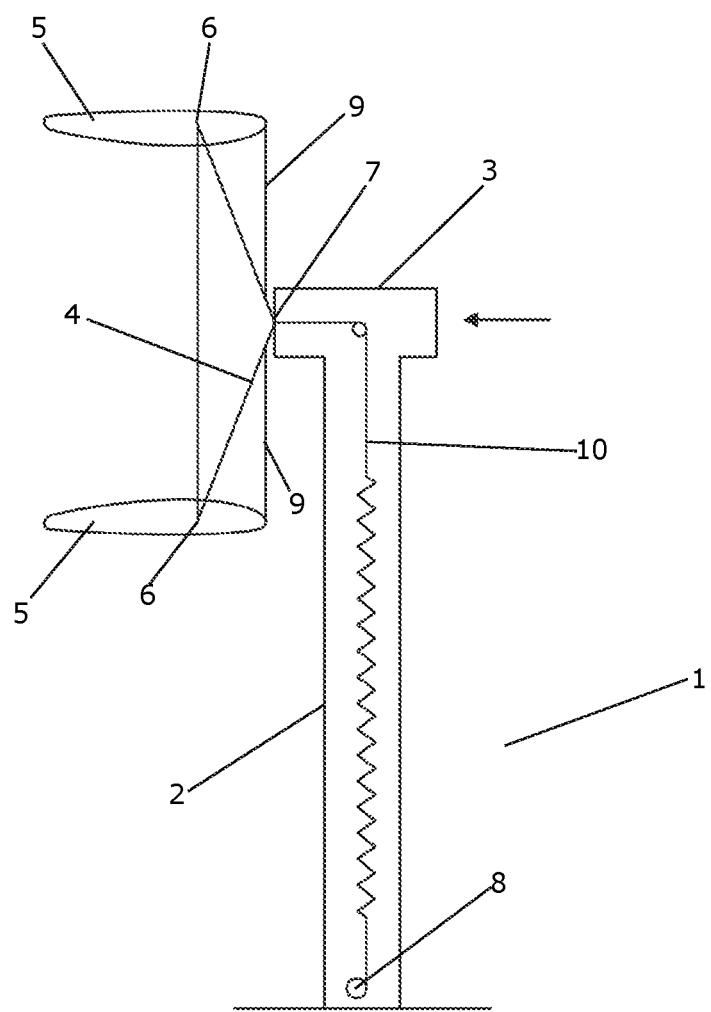
FIG. 3 is a side view of the wind turbine of FIG. 2 during operation at high wind speeds.

FIG. 3 shows the wind turbine 1 during normal operation, in a situation where the wind speed is high. In this situation, the rotational speed of the hub 7 may also be high, resulting in a high centrifugal force acting on the wind turbine blades 5. Due to the high wind speed, the aerodynamic forces on the wind turbine blades 5 are also high, thereby pushing the wind turbine blades 5 towards the shown position with low pivot angle. Accordingly, the centrifugal and aerodynamic forces are sufficient to overcome the biasing force of the spring biased common wire 10, and therefore the wind turbine blades 5 have been pivoted to a position which defines a minimum rotor diameter. As a consequence, the spring biased common wire 10 has been stretched, since the release mechanism 8 is still in the locked state.

It should be noted that the wind turbine blades 5 are able to pivot between the position illustrated in FIG. 2 and the position illustrated in FIG. 3 in a smooth and gradual manner. Accordingly, at any given wind speed, the pivot angle of each wind turbine blade 5 is a result of a balance between the forces originating from the spring biased common wire 10 and the centrifugal and aerodynamic forces resulting from the rotation of the hub 7.

Figure 4:
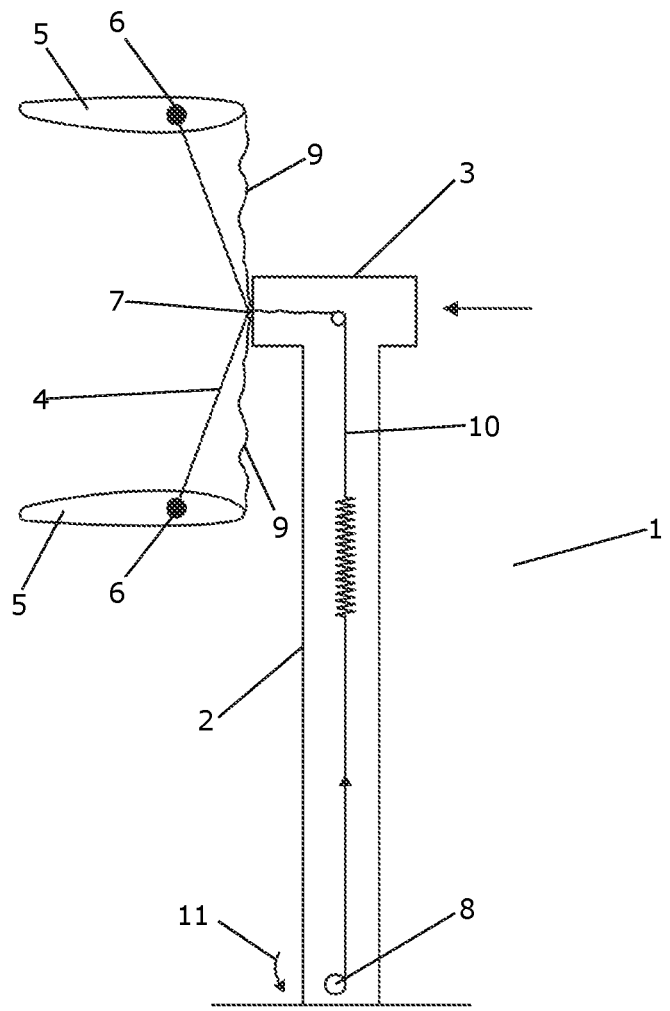
FIG. 4 is a side view of the wind turbine of FIGS. 2 and 3 after the release mechanism has been activated.

In FIG. 4 a situation has occurred, which requires that operation of the wind turbine 1 is stopped. The situation could, e.g., be an emergency situation. Therefore the release mechanism 8 has been activated in the sense that it is no longer in the locking state. The activation of the release mechanism 8 may be performed manually, automatically, mechanically, electrically, etc. Furthermore, the activation may be performed locally or remotely. As a consequence of the activation, the winding mechanism is now allowed to rewind, as illustrated by arrow 11, and the spring biased common wire 10 therefore contracts and leaves the spring biased common wire 10 as well as the connecting wires 9 in a slack state. Thereby the spring biased common wire 10 no longer pulls the wind turbine blades 5 towards the position defining maximum rotor diameter. In all situations with some rotational speed of the hub 7 and/or with some wind speed, the centrifugal force and/or the aerodynamic forces acting on the wind turbine blades 5 will move the wind turbine blades 5 towards the position defining minimum rotor diameter, as illustrated in FIG. 4, and thereby operation of the wind turbine 1 is stopped.

Once the wind turbine blades 5 have reached the safe pivot angle, i.e. the position defining minimum rotor diameter, the wind turbine blades 5 may be locked in this position, thereby preventing the wind turbine blades 5 from accidentally moving away from this pivot angle.

It should be noted that it is not ruled out that the wind turbine 1 comprises further means for moving the wind turbine blades 5 towards the position defining minimum rotor diameter, i.e. towards the 'barrel mode'. Such means could, e.g., include the use of a torsional spring at the hinge 6 or a system for pulling the wind turbine blade 5 via a wire connected to a position of the wind turbine blade 5 further outboard relative to the position of the hinge 6. The wire may, e.g., pull the wind turbine blade 5 towards barrel mode by the use of gravity, a spring or hydraulics. Furthermore, the wind turbine 1 may be temporarily operated in 'motor mode', i.e. rotating the hub 7 by directing energy from the generator to the hub 7, in order to ensure that the wind turbine blades 5 are moved to the safe pivot angle and securely locked there.

Since the release mechanism 8 is arranged at the bottom part of the tower 2, it is easily accessible for maintenance personnel. Therefore the stopping process described above can easily be initiated manually. Alternatively or additionally, the release mechanism 8 may be adapted to be activated in an automatic manner, e.g. in response to an emergency signal or a control signal received from a remote control centre. Furthermore, the activation may be performed mechanically, electrically, hydraulically, etc.

Figure 5:
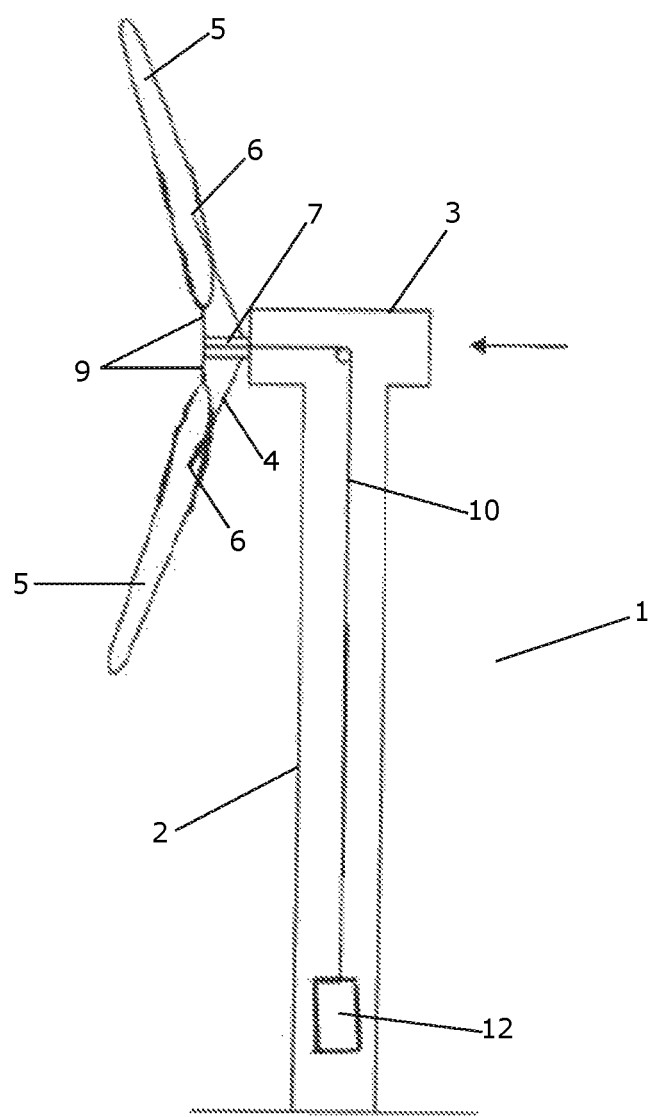
FIG. 5 is a side view of a wind turbine according to a second embodiment of the invention.

FIG. 5 is a side view of a wind turbine 1 according to a second embodiment of the invention. The wind turbine 1 of FIG. 5 is very similar to the wind turbine of FIGS. 2-4, and it will therefore not be described in detail here.

In the wind turbine 1 of FIG. 5 each of the wind turbine blades 5 is connected to a hanging mass 12 via separate connecting wires 9 and a common wire 10. Contrary to the situation described above with reference to FIGS. 2-4, the common wire 10 is not spring biased. Instead the hanging mass 12 performs the function provided by the spring bias in the embodiment of FIGS. 2-4, i.e. it pulls the wind turbine blades 5 towards a position defining maximum rotor diameter.

In the case that it is required to stop operation of the wind turbine 1, the hanging mass 12 may be disconnected from the common wire 10. Thereby the wind turbine blades 5 are no longer pulled towards the position defining maximum rotor diameter, and the wind turbine blades 5 are therefore free to move towards a safe position defining a smaller rotor diameter, essentially as described above with reference to FIG. 4.

As an alternative, the stop mechanism may be activated by reducing the tension in the common wire 10. This could, e.g., be obtained by increasing the length of the common wire 10, e.g. by unwinding the common wire 10 from a reel or the like, or by releasing the common wire 10 from a contact point on an inner wall of the tower 2. Alternatively, the tension in the common wire 10 may be reduced by lifting the hanging mass 12. Even though FIG. 5 shows that the wind turbine blades 5 are connected to one hanging mass 12, it should be noted that it is not ruled out that each wind turbine blade 5 is connected to a separate hanging mass 12.

Figure 6:
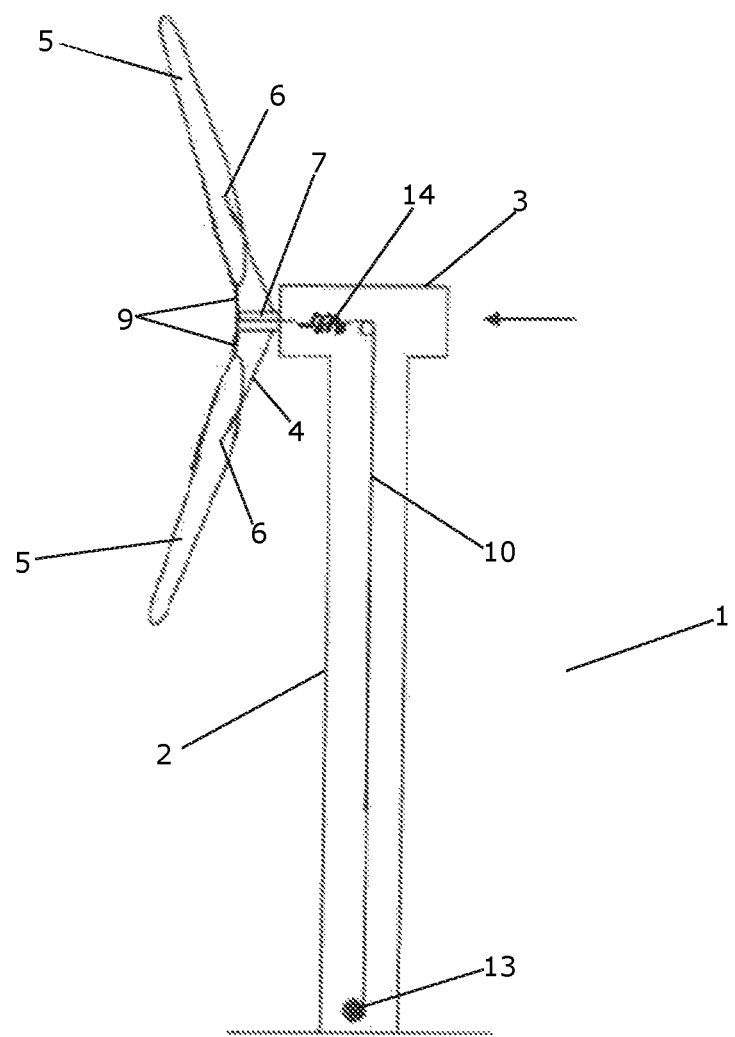
FIG. 6 is a side view of a wind turbine according to a third embodiment of the invention.

FIG. 6 is a side view of a wind turbine 1 according to a third embodiment of the pinvention. The wind turbine 1 of FIG. 6 is very similar to the wind turbines 1 of FIGS. 2-5, and it will therefore not be described in detail here.

In the wind turbine 1 of FIG. 6, each of the wind turbine blades 5 is connected to a fixed attachment point 13 at the bottom of the tower 2, via separate connecting wires 9 and a common wire 10. As it is the case in the wind turbine 1 of FIG. 5, the common wire 10 is not spring biased. Instead a part of the common wire 10 is wound onto a reel 14 or a similar mechanism arranged in the nacelle 3. It should be noted that the reel 14 could be positioned at any other suitable position along the common wire 10.

A tension is introduced in the common wire 10, due to a part of the common wire 10 being wound onto the reel 14, and thereby the wind turbine blades 5 are pulled towards a position defining maximum rotor diameter.

In the case that it is required to stop operation of the wind turbine 1, the length of the common wire 10 is increased by unwinding wire from the reel 14. Thereby the tension in the common wire 10 is reduced, and the wind turbine blades 5 are free to move towards a safe position defining a smaller rotor diameter, essentially as described above with reference to FIG. 4.

Figure 7:
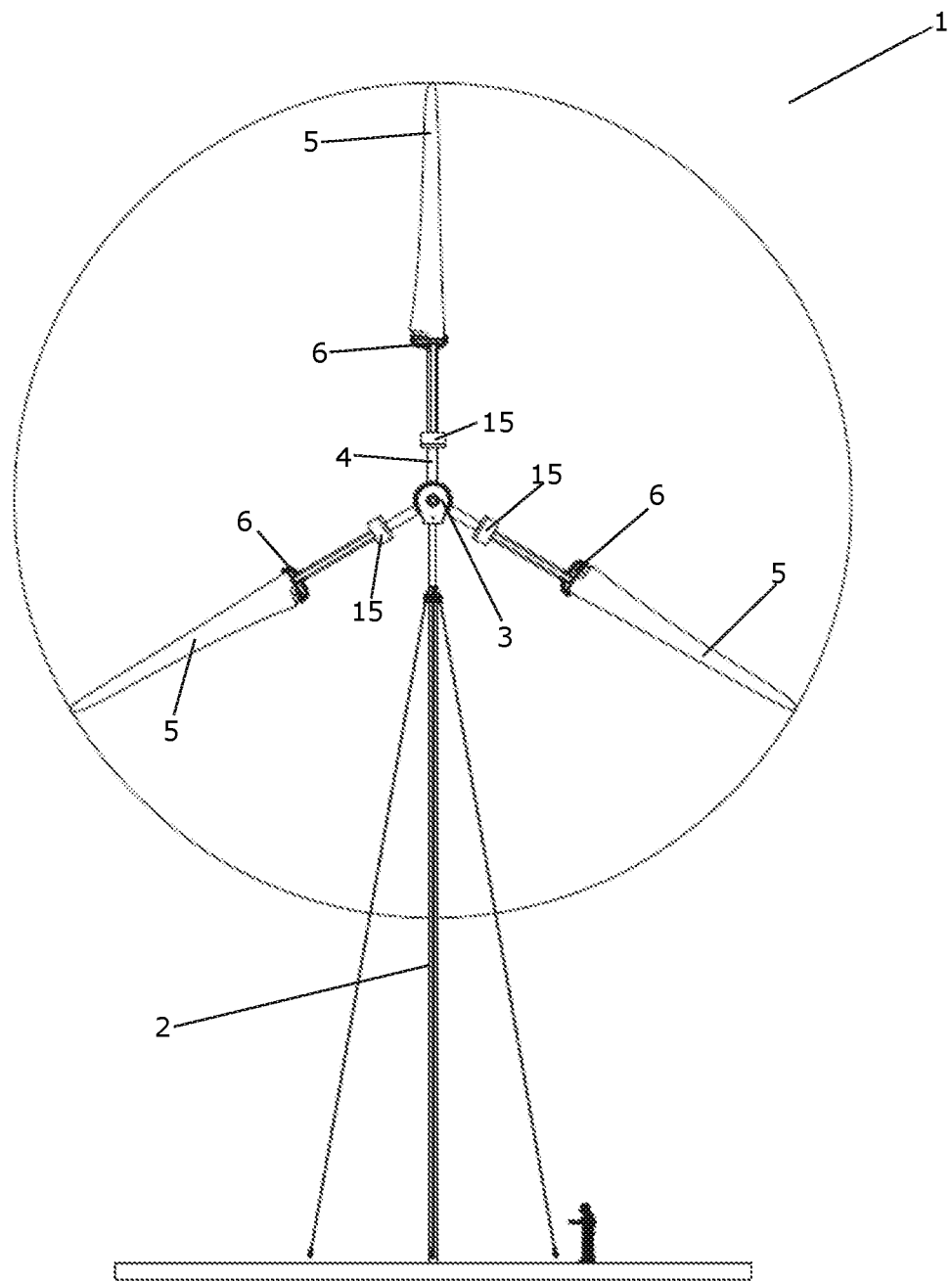
FIG. 7 is a view from behind of a wind turbine according to a fourth embodiment of the invention.
Figure 8:
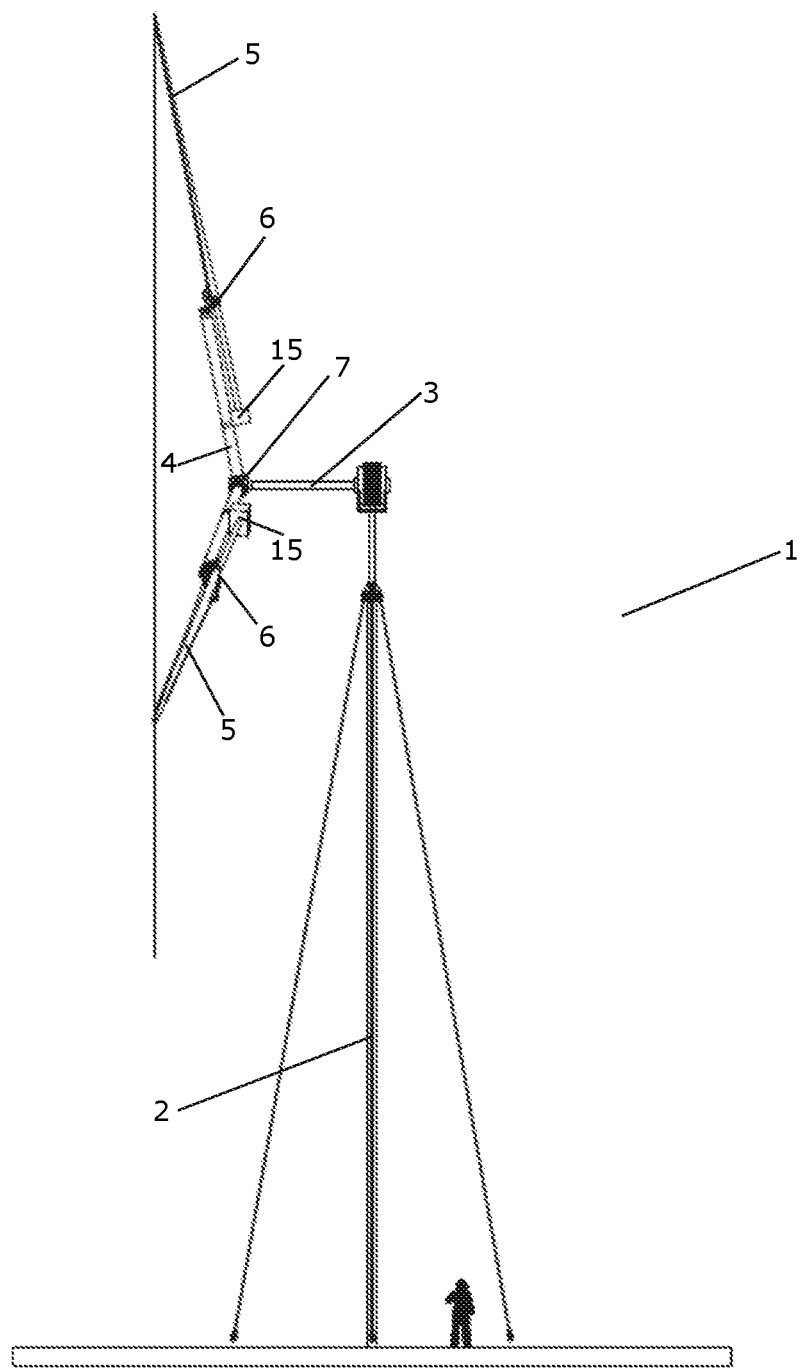
FIG. 8 is a side view of the wind turbine of FIG. 7, and FIGS. 9-12 illustrate a hinge for a wind turbine blade of a wind turbine according to an embodiment of the invention.

FIGS. 7 and 8 illustrate a wind turbine 1 according to a fourth embodiment of the invention. FIG. 7 shows the wind turbine 1 from behind, and FIG. 8 is a side view of the wind turbine 1. The wind turbine 1 of FIGS. 7 and 8 is very similar to the wind turbines 1 of FIGS. 2-6, and it will therefore not be described in detail here.

In the wind turbine 1 of FIGS. 7 and 8 the wind turbine blades 5 are designed in such a manner that an aerodynamic profile is defined from the position of the hinge 6 to the outer tip end of each wind turbine blade 5. However, on the opposite side of the hinge 6 the wind turbine blades 5 have a shape which is not aerodynamic, and a balancing mass 15 is mounted at the end of this part of the wind turbine blades 5. Thus, this part of the wind turbine blades 5 does not contribute to the power production of the wind turbine 1.

The wind turbine 1 is further provided with a stop mechanism (not shown). The stop mechanism could, e.g., be any of the stop mechanisms described above with reference to any of FIGS. 2-6.

FIGS. 9-12 illustrate a hinge 6 for a wind turbine blade 5 of a wind turbine according to an embodiment of the invention. The wind turbine blade comprises an outer part 5a, an inner part 5b and a hinge part 5c interconnecting the inner part 5a and the outer part 5b.

Figure 9:
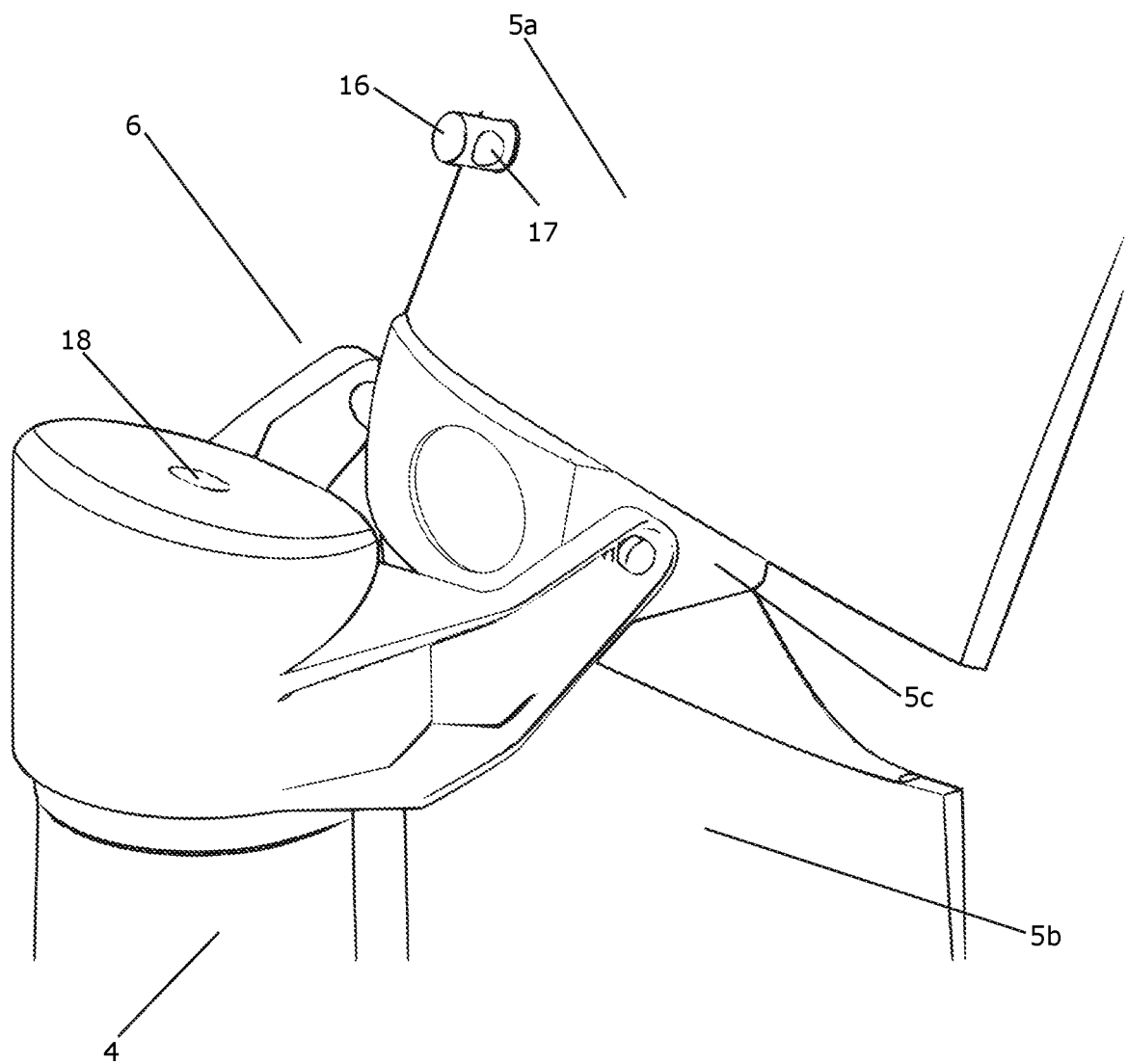

FIG. 9 is a perspective view of the hinge 6. It can be seen that the wind turbine blade 5 is connected to a blade carrying structure 4 via the hinge 6. Thereby the wind turbine blade 5 can perform pivot movements relative to the blade carrying structure 4 between a minimum pivot angle, defining a minimum rotor diameter, and a maximum pivot angle, defining a maximum rotor diameter. In FIG. 9 the wind turbine blade 5 is positioned at the maximum pivot angle.

A protruding locking part 16 is mounted on the outer part 5a of the wind turbine blade. The protruding locking part 16 is provided with an opening 17 which is adapted to receive a locking member (not shown) connected to the blade carrying structure 4. This will be described further below.

An opening 18 is formed in the blade carrying structure 4. When the wind turbine blade 5 is pivoted to the minimum pivot angle, the protruding locking part 16 will be received in the opening 18, and a locking member (not shown) is moved into engagement with the opening 17 of the locking part 16, thereby locking the wind turbine blade 5 at the minimum pivot angle. This will be described further below.

Figure 10:
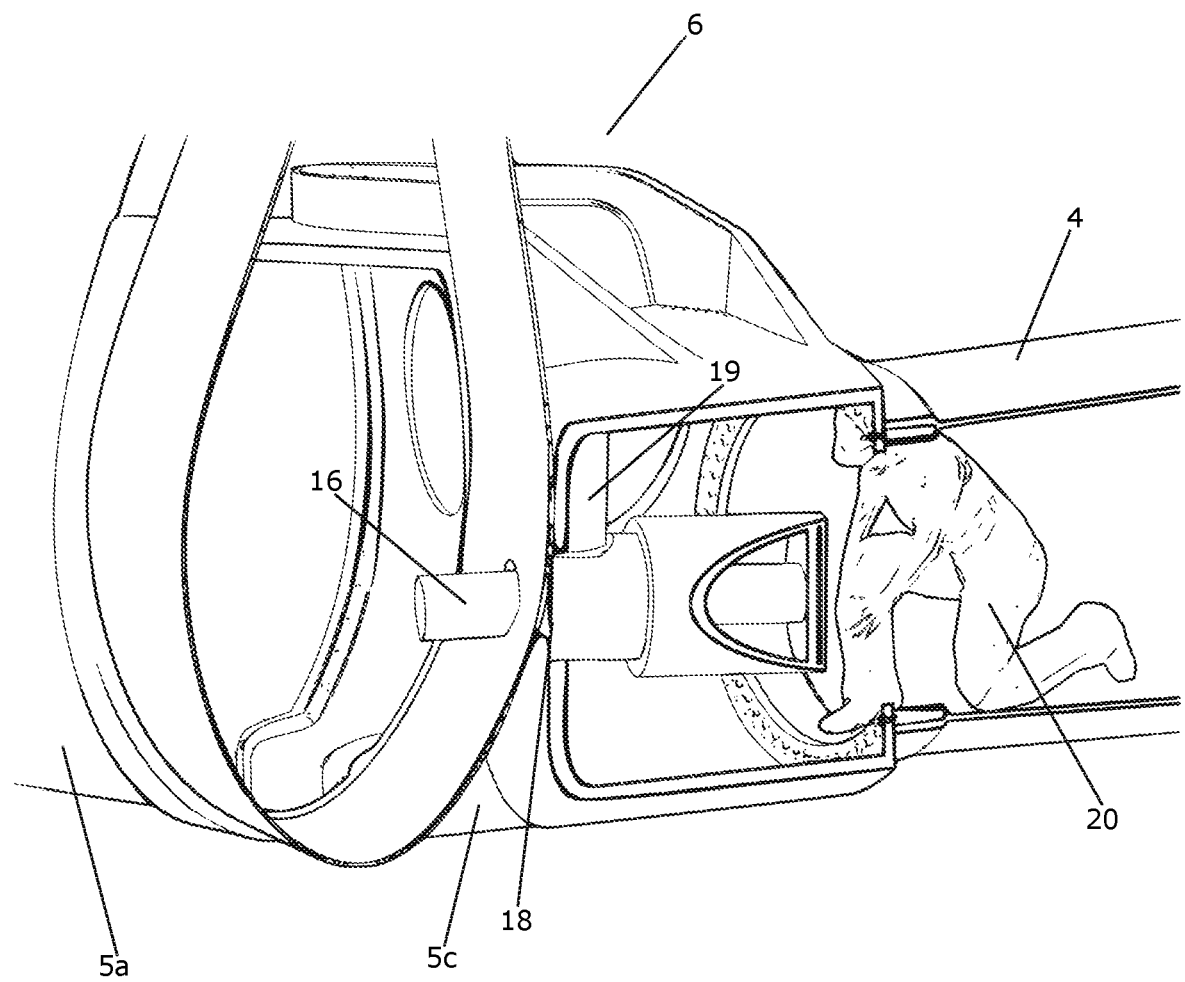

FIG. 10 is a cross sectional view of the hinge 6. In FIG. 10 the wind turbine blade 5 has been pivoted to the minimum pivot angle, and the protruding locking part 16 has been received in the opening 18 formed in the blade carrying structure 4. A locking member 19 has been moved into engagement with the opening (not shown) formed in the protruding locking part 16. Thereby the wind turbine blade 5 has been locked at the minimum pivot angle, i.e. it is prevented from accidentally moving away from this position.

Once the wind turbine blade 5 has been locked at the minimum pivot angle as described above, it may be required that the locking member 19 is actively moved out of engagement with the opening 17 formed on the locking part 16, before the wind turbine blade 5 is once again allowed to perform pivoting movements relative to the blade carrying structure 4. This could be performed locally or remotely. Furthermore, the locking member 19 may be moved by means of a mechanical, an electrical, or any other suitable kind of moving mechanism. Finally, the movement of the locking member 19 may be initiated manually, electrically, or in any other suitable manner. In FIG. 10 an operator 20 is shown in order to illustrate that the movement of the locking member 19 may be initiated manually.

Figure 11:
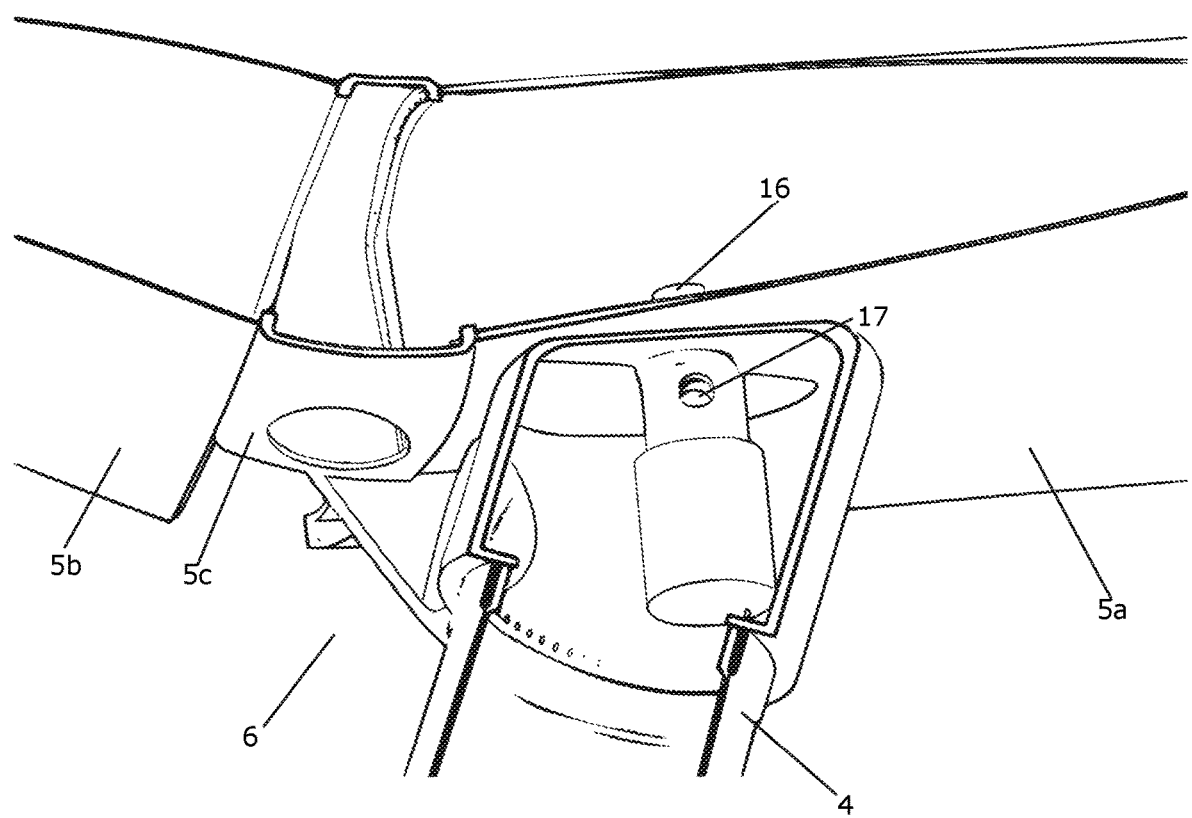

FIG. 11 is a cross sectional view of the hinge 6, showing the wind turbine blade 5 at the minimum pivot angle. The position of the opening 17 inside the blade carrying structure 4 can be seen.

Figure 12:
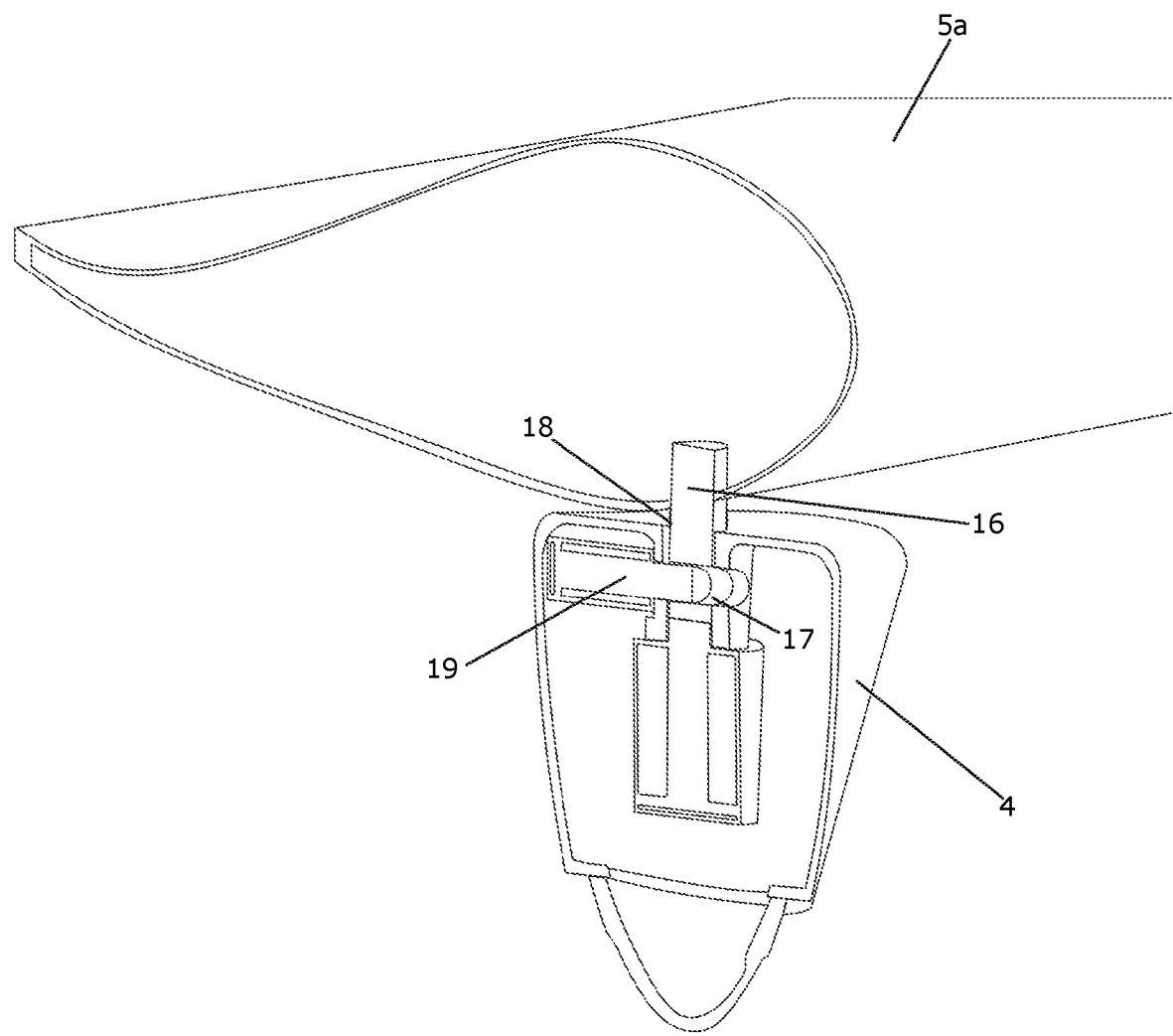

FIG. 12 is a cross sectional view of the locked wind turbine blade 5. It can be seen that the protruding locking part 16 has been received in the opening 18 formed in the blade carrying structure 4. It can further be seen that the opening 17 formed in the protruding locking part 16 is arranged at a position corresponding to the position of the locking member 19, and that the locking member 19 has been moved into engagement with the opening 17, thereby locking the wind turbine blade 5 at the minimum pivot angle.

The locking member 19 may be spring biased towards the position shown in FIG. 12. Thereby the protruding locking part 16 may be moved past the locking member 19, pushing it aside, until the opening 17 of the protruding locking part 16 is positioned next to the locking member 19. Then the spring bias will move the locking member 19 into the opening 17, thereby locking the wind turbine blade 5.

The invention claimed is:

1. A wind turbine comprising a tower, a nacelle mounted on the tower via a yaw system, a hub mounted rotatably on the nacelle, the hub comprising a blade carrying structure, and one or more wind turbine blades connected to the blade carrying structure, wherein each of the wind turbine blades defines an inner tip end and an outer tip end, and wherein each of the wind turbine blades is connected to the blade carrying structure via a hinge at a hinge position of the wind turbine blade, each wind turbine blade thereby being arranged to perform pivot movements relative to the blade carrying structure between a minimum pivot angle and a maximum pivot angle such that the outer tip end moves towards a rotational axis of the hub,
wherein the wind turbine further comprises a stop mechanism arranged to move the wind turbine blades to a safe pivot angle in the case of an emergency, the stop mechanism comprising a release mechanism and at least one wire interconnecting the release mechanism and each of the wind turbine blades, wherein activation of the release mechanism causes an abrupt change in a pulling force applied to the wind turbine blades by the wire(s), the change in pulling force causing the wind turbine blades to move immediately to the safe pivot angle.

2. The wind turbine according to claim 1, wherein the at least one wire is a spring biased wire.

3. The wind turbine according to claim 1, wherein the release mechanism comprises a hanging mass attached to the wire.

4. The wind turbine according to claim 1, wherein the release mechanism is or comprises a winding mechanism for winding up the wire.

5. A wind turbine comprising a tower, a nacelle mounted on the tower via a yaw system, a hub mounted rotatably on the nacelle, the hub comprising a blade carrying structure, and one or more wind turbine blades connected to the blade carrying structure, wherein each of the wind turbine blades defines an inner tip end and an outer tip end, and wherein each of the wind turbine blades is connected to the blade carrying structure via a hinge at a hinge position of the wind turbine blade, each wind turbine blade thereby being arranged to perform pivot movements relative to the blade carrying structure between a minimum pivot angle and a maximum pivot angle,
wherein the wind turbine further comprises a stop mechanism arranged to move the wind turbine blades to a safe pivot angle in the case of an emergency, the stop mechanism comprising a release mechanism and at least one wire interconnecting the release mechanism and each of the wind turbine blades, wherein activation of the release mechanism causes an abrupt change in a pulling force applied to the wind turbine blades by the wire(s), the change in pulling force causing the wind turbine blades to move immediately to the safe pivot angle, and
wherein each of the wind turbine blades is connected to the release mechanism via a separate wire.

6. The wind turbine according to claim 1, wherein each of the wind turbine blades is connected to a common wire which is connected to the release mechanism.

7. The wind turbine according to claim 1, wherein the release mechanism is arranged at a bottom part of the tower.

8. The wind turbine according to claim 1, wherein the hinge position of each of the wind turbine blades is arranged at a distance from the inner tip end and at a distance from the outer tip end.

9. The wind turbine according to claim 8, wherein each of the wind turbine blades is connected to the wire at a position of the wind turbine blade which is between the hinge position and the inner tip end of the wind turbine blade.

10. The wind turbine according claim 8, wherein each of the wind turbine blades has a centre of mass for the wind turbine blade at rest, the centre of mass being positioned between the hinge position and the inner tip end of the wind turbine blade.

11. The wind turbine according to claim 1, further comprising a balancing mass arranged on the nacelle opposite to an attachment position of the hub.

12. The wind turbine according to claim 1, wherein the wind turbine is a downwind wind turbine.

13. A wind turbine comprising a tower, a nacelle mounted on the tower via a yaw system, a hub mounted rotatably on the nacelle, the hub comprising a blade carrying structure, and one or more wind turbine blades connected to the blade carrying structure, wherein each of the wind turbine blades defines an inner tip end and an outer tip end, and wherein each of the wind turbine blades is connected to the blade carrying structure via a hinge at a hinge position of the wind turbine blade, each wind turbine blade thereby being arranged to perform pivot movements relative to the blade carrying structure between a minimum pivot angle and a maximum pivot angle,
wherein the wind turbine further comprises a stop mechanism arranged to move the wind turbine blades to a safe pivot angle in the case of an emergency, the stop mechanism comprising a release mechanism and at least one wire interconnecting the release mechanism and each of the wind turbine blades, wherein activation of the release mechanism causes an abrupt change in a pulling force applied to the wind turbine blades by the wire(s), the change in pulling force causing the wind turbine blades to move immediately to the safe pivot angle, and
wherein the wind turbine further comprises biasing means biasing the wind turbine blades towards a position providing a maximum rotor diameter.

14. The wind turbine according to claim 13, wherein the at least one wire is a spring biased wire, and wherein the spring biased wire forms part of the biasing means.

15. The wind turbine according to claim 1, further comprising end stop mechanisms arranged to slow pivot movements of the wind turbine blades in a region near the minimum pivot angle and/or in a region near the maximum pivot angle.

16. The wind turbine according to claim 15, wherein the end stop mechanism comprises a spring and/or a damper.

17. The wind turbine according to claim 1, wherein the hinge of each of the wind turbine blades is embedded in the wind turbine blade.

18. A wind turbine comprising a tower, a nacelle mounted on the tower via a yaw system, a hub mounted rotatably on the nacelle, the hub comprising a blade carrying structure, and one or more wind turbine blades connected to the blade carrying structure, wherein each of the wind turbine blades defines an inner tip end and an outer tip end, and wherein each of the wind turbine blades is connected to the blade carrying structure via a hinge at a hinge position of the wind turbine blade, each wind turbine blade thereby being arranged to perform pivot movements relative to the blade carrying structure between a minimum pivot angle and a maximum pivot angle, wherein the wind turbine further comprises a stop mechanism arranged to move the wind turbine blades to a safe pivot angle in the case of an emergency, the stop mechanism comprising a release mechanism and at least one wire interconnecting the release mechanism and each of the wind turbine blades, wherein activation of the release mechanism causes an abrupt change in a pulling force applied to the wind turbine blades by the wire(s), the change in pulling force causing the wind turbine blades to move immediately to the safe pivot angle, and wherein the wind turbine further comprises a locking mechanism for locking the wind turbine blades at the safe pivot angle.

19. The wind turbine according to claim 1, wherein at the minimum pivot angle each wind turbine blade extends along a direction that is substantially parallel to the rotational axis of the hub.

* * * * *